United States Patent [19]

Saunders et al.

[11] 4,204,008

[45] May 20, 1980

[54] PREPARATION OF PROTEIN CONCENTRATES FROM WHEY AND SEED PRODUCTS

[75] Inventors: Robert M. Saunders; George O. Kohler, both of El Cerrito, Calif.

[73] Assignee: The United States of America as represented by the Secretary of Agriculture, Washington, D.C.

[21] Appl. No.: 974,170

[22] Filed: Dec. 28, 1978

Related U.S. Application Data

[63] Continuation-in-part of Ser. No. 839,711, Oct. 5, 1977, abandoned, and a continuation-in-part of Ser. No. 695,616, Jun. 14, 1976, Pat. No. 4,064,283.

[51] Int. Cl.² ............................ A23J 1/12; A23J 1/14; A23J 1/20
[52] U.S. Cl. ..................................... 426/583; 426/656; 426/657
[58] Field of Search ............... 426/583, 618, 656, 657, 426/622, 629, 634, 431, 436, 615; 260/123.5

[56] References Cited

U.S. PATENT DOCUMENTS

| | | | |
|---|---|---|---|
| 3,397,991 | 8/1968 | Johnson et al. | 426/656 |
| 3,653,912 | 4/1972 | Koski et al. | 260/123.5 |

OTHER PUBLICATIONS

Smith, A. K., "Soybeans and Technology," vol. 1, The Avi Publ. Co., Inc., Westport, Conn., pp. 321–322.

*Primary Examiner*—Robert A. Yoncoskie
*Attorney, Agent, or Firm*—M. Howard Silverstein; David G. McConnell; Theodore J. Leitereg

[57] ABSTRACT

Stable protein concentrates are prepared from whey and seed products by a process which comprises mixing the seed product and the whey, adding alkali to the mixture, and separating a juice containing soluble protein and suspended starch and fat therefrom. Then, the juice, after adjustment to about pH 7, is dried directly to give a protein concentrate.

4 Claims, No Drawings

PREPARATION OF PROTEIN CONCENTRATES FROM WHEY AND SEED PRODUCTS

CROSS-REFERENCE TO RELATED APPLICATIONS

This is a continuation-in-part of our co-pending application Ser. No. 839,711, filed Oct. 5, 1977, now abandoned and a continuation-in-part of application Ser. No. 695,616, filed June 14, 1976, now U.S. Pat. No. 4,064,283.

BACKGROUND OF THE INVENTION

1. Field of the Invention

The invention relates to and has among its objects the provision of novel processes for obtaining stable, food-grade protein concentrates from seed products, particularly seed by-products, and whey. Further objects of the invention will be evident from the following description wherein parts and percentages are by weight unless otherwise specified.

2. Description of the Prior Art

In the treatment of seed products to obtain flour, germ, peeled seeds, etc., several steps including grinding and sifting are often employed, whereby the purified product is separated from other fragments of the seed. These other fragments are by-products and include, for example, bran, shorts, and hulls. The by-products often comprise about 20-25% of the seed and contain approximately 20-25% of the protein. In addition, the by-products contain a high percentage of B-complex vitamins, such as niacin, pyridoxine, pantothenic acid, riboflavin, and thiamine. However, because of their high fiber and ash content the by-products are not suitable for human nutritional needs. The high fiber and ash content tends to accelerate the passage of the food through the human digestive tract. Consequently, only a small nutritive contribution is realized. Thus, these by-products are useful only as feed for ruminant animals, to whom the nutrients are more available.

A process for securing stable protein concentrates from millfeed is described in U.S. Pat. No. 3,859,451 (hereinafter referred to as '451) by Saunders et al. In the '451 process the millfeed is mixed with water in the ratio of about 3-5 lbs. of water per pound of millfeed. Then, alkali is added to the mixture to obtain a pH of 8 to 10. Next, a juice is separated from the solids by conventional means such as filtering the mixture through a filter cloth, centrifugation, etc. The pH of the juice is adjusted to 5.5-6.0 and steam is applied thereto to attain a temperature of 85° C., whereupon the product coagulates. The coagulated protein concentrate is collected conventionally and washed.

One problem with the '451 process is that large quantities of water are required, thus increasing expenses and wasting energy, especially in drying the product. A further problem is that the protein concentrate produced, although high in protein is less than perfect for several reasons. First, the protein content could be much greater in order to satisfy increasing demands for higher-protein products. Secondly, the quality of the protein in the '451 concentrate could be improved because the balance of proteins is nutritionally inadequate as will be explained hereinbelow.

In U.S. Pat. No. 3,397,991 (hereinafter referred to as '991) a homogeneous blend of proteins derived from two or more different sources is prepared. To this end the protein sources are formed into an aqueous slurry to which is added sufficient alkali to attain a pH of 9-12. Preferably, the slurry is then heated to 66°-93° C. for a time necessary to solubilize the proteins. If the protein sources are solubilized individually, the solubilized proteins are combined. Following solubilization the aqueous solution of proteins is separated and treated to precipitate a protein concentrate by adjusting the cation or hydrogen ion concentration of the solution to the appropriate point. In a preferred embodiment the so-precipitated protein is neutralized and resolubilized by addition of alkali and the solution is spray-dried to yield a protein product.

SUMMARY OF THE INVENTION

The invention described herein provides a means for obviating the problems outlined above. As a result of the process of the invention, a stable protein concentrate of increased nutritional value can be obtained. The product of the invention contains not only protein but also carbohydrates, such as starch, fat, and vitamins, and is low in fiber and ash content. The protein concentrate of the invention then is a well-balanced food.

In the process of the invention whey is mixed with the seed product. Then, alkali is added to the mixture to reach a pH of 9-10. The resulting mixture is treated to separate a juice from the fibrous residue and the juice is treated to recover a protein concentrate therefrom by adding acid to a pH of 5-6 and heating the mixture to 85°-95° C. Alternatively and preferably, a protein concentrate can be recovered by adding acid to the juice to pH 3 to 4 and subsequently adding sodium hexametaphosphate in an amount necessary to precipitate the protein product. Finally, an adequate protein concentrate can be obtained by drying the alkaline extract after adjusting the pH to about 7.

One advantage of the invention is that both of the materials used to generate the protein concentrate can be waste products (seed by-products and whey). Thus, the process of the invention is inexpensive. Furthermore, pollution of the environment is avoided. Whey is generally disposed of by dumping it into water-ways, i.e., lakes, rivers, streams. This practice has many detrimental effects on the environment. However, as a result of the process of the invention, whey can be treated to recover valuable proteinaceous material therefrom.

A further economical and pollutional advantage of the invention is that water need not be added to the seed product-whey mixture (as required in the '451 process). Consequently, less money is expended in the instant method since the cost for water is avoided. In addition, since added water is unnecessary, substantial savings will be realized in drying the final product.

The most important advantage of the invention is that the product so-prepared is an excellent source of protein, superior to other products such as that produced by the '451 process. In the first place, the instant product contains more protein than other products. More important, however, is the fact that the product of the invention is a better quality protein product, i.e., its protein concentration is more balanced than in other products. Thus, the efficiency of the protein, or in other words the nutritional balance of the protein, is much greater in the protein concentrate of the invention. This means that the product of the invention supplies a better balance and, therefore, more of the different amino acids necessary for growth and development.

Another advantage of the invention is that the product contains a high percentage of fat and many fat-soluble vitamins. Thus, a material balanced in its protein, carbohydrate, and fat content is obtained. In addition, the instant product exhibits an extremely important characteristic, which can be explained as follows: Although the proportion of fat is high, the product does not air-oxidize, i.e., become rancid, when stored for prolonged periods. The instant product contains small amounts of a natural antioxidant, an alkyl resorcinol, which is extracted from the millfeed together with the proteins and other materials. Furthermore, the product of the invention deters rancidity when added to foods capable of becoming rancid.

DESCRIPTION OF THE PREFERRED EMBODIMENTS

In the following description, application of the method of the invention to seed products is discussed. Seed products are those products derived from seeds and include, but are not limited to, flour, germ, peeled seeds, etc., and by-products such as bran, shorts, and hulls. Examples of types of seeds, the products of which may be used in the instant invention, include grains, legumes, oil seeds, etc.

Typical examples of grains are wheat, rice, corn, barley, oats, triticale, and the like. Illustrative examples of legume seeds include those from the genus Soja (soybeans), the genus Phaseolus (beans such as large white, small white, pinto, red kidney, lima, etc.), the genum Pisum (smooth or wrinkled peas and yellow or green varieties, etc.), the genus Vigna (blackeye beans, etc.), the genus Lens (lentils, etc.), the genus Cicer (garbanzo or chick peas, etc.), etc. Examples of oil seeds include cotton seed, rape seed, sunflower seed, safflower seed, sesame seed, peanuts, and the like.

Whey is the liquid remaining after removal of casein and fat from milk during the cheesemaking process. Acid whey is obtained in the production of cottage cheese and has a pH of about 4. Sweet whey (pH of about 6) is produced in the manufacture of Cheddar and other kinds of cheese. The term "whey" used herein includes both acid and sweet whey and the process of the invention can be applied successfully using each individually or a mixture of both.

In the first step of the process of the invention whey is mixed with the seed product. Generally, the proportion of these agents is 3 to 5 parts of whey to one part of seed product. Preferably, the mixture is subjected to blending action, that is, intensive mixing coupled with application of vigorous and repeated shearing action.

The seed product-whey combination is then mixed with alkali to attain a pH of about 9-10. Ammonia, sodium and potassium hydroxide, and the like are suitable. Ammonia is preferred because the added nitrogen, carried over in the branny residue after separation of the protein concentrate, is beneficial to ruminant animals. Contact between the seed product-whey mixture and the alkali is maintained for about 10 to 20 minutes.

Following treatment with alkali the mixture is treated to separate a juice containing soluble proteins from a solid material, Any conventional means for separating juice from solids can be used. For example, the mixture can be filtered under high pressure using a porous bag known in the art as a filter cloth. Generally, pressures of 25 to 100 psi are employed. Alternatively, the mixture can be centrifuged. Other methods will be apparent to those skilled in the art.

Next, the juice is treated in one of two ways to obtain a stable protein concentrate therefrom. In the first method, the pH of the juice from above is adjusted to about 5 to 6 by application of acid. Any food-grade acid can be used. Thus, one may apply hydrochloric acid, sulfuric acid, phosphoric acid, citric acid, tartaric acid, and the like to achieve the desired pH. Following pH adjustment, the mixture is heated to a temperature of about 85°-95° C. to precipitate the protein concentrate. The preferred temperature is 95° C. whereat maximum precipitation of the protein concentrate is realized.

In an alternative and preferred method the pH of the juice from above is adjusted to 3-4 by application of one of the abovementioned food-grade acids. Then, the juice is treated with sodium hexametaphosphate in an amount sufficient to precipitate a stable protein concentrate. Usually, the amount of sodium hexametaphosphate necessary is about 3 to 10 grams per liter of acidified juice.

The precipitated product is collected by such conventional procedures as centrifugation and decantation, filtration, etc. Following its collection, the wet product is dried by methods such as drum-drying, freeze-drying, and the like. Preferably, the collected material is washed with water prior to drying to further reduce its content of ash. Approximately 5 to 20 parts of water per one part of product is used in this washing operation. For optimum results the pH of the washing medium should be about 5.

A product with increased protein content can be prepared by the following process: After separating the juice from the solid material, the juice is centrifuged, whereby much of the starch is removed. Following this step the juice is treated as outlined above to precipitate a protein concentrate. Thus, the juice may be treated with acid to pH 5-6 and then heated at 85°-95° C. Alternatively, the pH of the juice can be adjusted to 3-4 by addition of acid and then sodium hexamethaphosphate can be added to precipitate the product.

An adequate protein concentrate, i.e., one suitable for human consumption, may also be obtained by first adjusting the pH of the alkaline juice to about 7. Then, the juice can be dried to give a solid that can be employed directly as a protein concentrate. In this way the protein isolate is obtained in a larger yield than that realized in either of the above two precipitation methods. However, the product has a lower protein and fat content than the precipitated material. The product can be dried according to conventional methods such as drum-drying, freeze-drying, and the like.

EXAMPLES

The invention is further demonstrated by the following illustrative examples.

Example 1

Preparation of Protein Concentrate from Wheat Shorts

A. Wheat shorts (100 g) were mixed with 500 g of commercial sweet whey at room temperature in a Hobart mixer. The pH of the mixture was adjusted to 9 by addition of 3 N sodium hydroxide. The pH was maintained at 9 for 15 minutes.

The mixture was squeezed in a nylon bag. A pressure of 100 psi was applied to the mixture to force the juice through the porous bag; 430 ml of juice was obtained.

The juice was treated with 1 N hydrochloric acid to adjust the pH to 5 and then heated to 95° C. and then allowed to cool. The precipitated product was collected by centrifugation, washed with 400 ml of water at pH 5, and then dried to give 20 g of product.

B. The procedure outlined in A was repeated with the following exception: After the juice (430 ml) was obtained from the nylon bag, 1 N hydrochloric acid was added to obtain a pH of 3. The, 1.3 g of sodium hexamethaphosphate (SHMP) was added to the acidified liquid.

The dried product weighed 25 g.

C. The procedure outlined in A was repeated except that acid whey was used in place of sweet whey. The yield of product was 16 g.

D. The procedure outlined in B was repeated except that acid whey was used in place of sweet whey. The yield of product was 20 g.

The results of the above experiments are tabulated below.

Table 1

| Run | Whey type | Method of precipitation | Yield[1] (%) | Protein (%) N × 6.25 | Fat (%) | Fiber (%) | Ash (%) | Carbohydrates[2] (%) |
|---|---|---|---|---|---|---|---|---|
| A | Sweet | pH 5, 95° C | 20 | 35 | 6.9 | 0.4 | 2.5 | 55 |
| B | Sweet | pH 3, SHMP | 25 | 43 | — | — | — | — |
| C | Acid | pH 5, 95° C | 16 | 32 | 1.0 | 0.7 | 3.5 | 63 |
| D | Acid | pH 3, SHMP | 20 | 36 | — | — | — | — |

[1]Analysis on a dry weight basis.
[2]>90% starch.

Example 2

Preparation of Protein Concentrate of Low Starch Content from Wheat Shorts

E. The procedure described in Example 1, Run A, was followed with the following additional step: After pressing through a nylon bag, the juice was centrifuged, whereby to remove most of the starch. The juice was then treated to recover a product therefrom as described in Example 1, Run A.

F. The above procedure (E) was repeated to obtain a juice free of starch. The juice was then treated to obtain a protein product as described in Example 1, Run B.

G. The procedure followed in E above was repeated with acid whey used in place of sweet whey.

H. The procedure described in F above was employed. Acid whey was substituted for sweet whey.

The results are summarized below.

Table 2

| Run | Whey type | Method of precipitation | Yield[1] (%) | Protein (%) N × 6.25 | Fat (%) | Fiber (%) | Ash (%) | Carbohydrates[2] (%) |
|---|---|---|---|---|---|---|---|---|
| E | Sweet | pH 5, 95°C | 9 | 70 | 13 | 0.2 | 4.3 | 14 |
| F | Sweet | pH 3, SHMP | 10 | 77 | — | — | — | — |
| G | Acid | pH 5, 95°C | 5 | 77 | 6 | 0.2 | 2.7 | 14 |
| H | Acid | pH 3, SHMP | 6 | 85 | — | — | — | — |

[1]Analysis on a dry weight basis.
[2]>90% starch.

Example 3

Preparation of Protein Concentrate from Rice Bran

J. The procedure described in Example 1, Run A, was repeated using rice bran in place of wheat shorts.

K. The procedure described in Example 1, Run C, was repeated using rice bran in place of wheat shorts.

L. The procedure outlined in Example 2, Run E, was followed; rice bran was substituted for wheat shorts.

M. The procedure followed in Example 2, Run G, was repeated with the exception that rice bran was used in place of wheat shorts.

The results are tabulated below.

Table 3

| Run | Whey type | Method of precipitation | Yield[1] (%) | Protein (%) N × 5.95 | Fat (%) | Fiber (%) | Ash (%) | Carbohydrates[2] (%) |
|---|---|---|---|---|---|---|---|---|
| J | Sweet | pH 5, 95°C | 23 | 23.7 | 31.0 | 2.0 | 8.6 | 34.7 |
| K | Sweet | pH 5, 95°C | 9 | 47.8 | 46.4 | 0.1 | 1.5 | 4.2 |
| L | Acid | pH 5, 95°C | 22 | 34.0 | 24.0 | 3.2 | 11.5 | 27.3 |
| M | Acid | pH 5, 95°C | 7 | 54.1 | 32.1 | 0.4 | 3.2 | 10.2 |

[1]Analysis on a dry weight basis.
[2]>90% starch.

Example 4

Preparation of Protein Concentrate from Soy Flour

N. The procedure outlined in Example 1, Run A, was repeated using soy flour in place of wheat shorts.

O. The procedure in Example 1, Run C, was followed; soy flour was used in place of wheat shorts.

The results are summarized below.

Table 4

| Run | Whey type | Method of precipitation | Yield[1] (%) | Protein (%) N × 5.95 | Fat (%) | Fiber (%) | Ash (%) | Carbohydrates[2] (%) |
|---|---|---|---|---|---|---|---|---|
| N | Sweet | pH 5, 95°C | 23 | 91.0 | 0.5 | 0.6 | 2.8 | 5.1 |
| O | Acid | pH 5, 95°C | 22 | 94.0 | 0.3 | 0.5 | 1.9 | 3.3 |

[1] Analysis on a dry weight basis.
[2] >90% starch.

Example 5

Protein Efficiency Ratio

The protein efficiency ratio (PER) was determined according to standard procedures described in "Official Methods of Analysis," Association of Official Analytical Chemists (AOAC), Twelfth Edition, Washington, D.C. (1975). Test procedures AOAC 43.183–43.187 were employed. Accordingly, weanling rats were fed a diet wherein the samples and the reference materials were prepared, having the same content of nitrogen (N), fat, ash, moisture, and crude fiber.

Two samples prepared in accordance with the invention were tested. Sample P was prepared according to Example 1, Run B; sample Q was prepared according to Example 1, Run D.

For purposes of comparison, sample R, prepared in accordance with the '451 process, was also tested.

Casein was employed as the standard reference material. The PER of casein was adjusted to 2.50 and the PER of each sample was adjusted accordingly.

The results are sumarized in the following table.

Table 5

| Sample | PER* |
|---|---|
| P (invention) | 2.03 |
| Q (invention) | 2.12 |
| R ('451 process) | 1.53 |
| Casein (control) | 2.50 |

*Significantly different at P < 0.01 (P and Q compared to R).

The protein efficiency ratio (PER) is a measure of the weight gain over the protein intake. The larger the value of PER, the better the quality of protein ingested. Thus, it is quite evident that samples P and Q, prepared in accordance with the invention, contain better quality protein, i.e., more of all the proteins necessary for balanced diet, than does sample R, prepared in accordance with the '451 process.

Example 6

Effect of Temperature on Precipitation of Protein Concentrate

The procedure outlined in Example 1, Run C, was followed. In one case the acidified juice (pH 5) was heated to 95° C. in accordance with the invention. The yield of protein concentrate was 20 g.

For comparative purposes, another sample of the acidified juice was heated to 85° C. The yield of protein concentrate was only 15 g.

Also for comparative purposes, another sample of the above juice acidified to pH 6 was heated to 85° C. The yield of protein concentrate was only 15 g.

Example 7

Protein Concentrate by Drying a Whey-Wheat Shorts Extract

S. The procedure of Example 1, Run A, was followed to obtain an alkaline juice. The treatment of this juice with hydrochloric acid and heat was omitted.

The pH of the alkaline juice was adjusted to 7 by addition of dilute hydrochloric acid. The so-treated juice was dried by spray-drying technique.

T. The above procedure was repeated with the exception that acid whey was substituted for sweet whey.

The results of the above experiments are tabulated below.

| Run | Whey type | Yield[1] (%) | Protein (%) N × 6.25 | Fat (%) | Fiber (%) | Ash (%) | Carbohydrates[2] (%) |
|---|---|---|---|---|---|---|---|
| S | Sweet | 36 | 22 | 0.7 | 0.2 | 9.0 | 68 |
| T | Acid | 38 | 21 | 0.3 | 0.2 | 11.8 | 66 |

[1] Analysis on a dry weight basis.
[2] 90% starch.

Example 8

Acidification of Sweet Whey

A. Commerical sweet whey (50 g, pH 5.9) was mixed with an amount of 1 N hydrochloric acid sufficient to attain a pH of 5. The solution was filtered and the precipitate weighed 0 g, i.e., no precipitation occurred.

B. Commercial sweet whey was adjusted to pH 9 by addition of 3 N sodium hydroxide. The solution was held for 15 minutes at room temperature. Then, 1 N hydrochloric acid was added to reach a pH of 6. The mixture was filtered and 0 g of precipitate was obtained.

The above procedure was repeated four times. The only variation was the adjustment of the pH of the alkaline whey to 5, 4, 3, and 2, respectively, instead of 6 as in the previous experiment. In all experiments no precipitate was formed.

The above experiments demonstrate that the '991 process wherein proteins are solubilized in alkali and precipitated by acidification and wherein the precipitate is neutralized and spray-dried could not be employed to recover proteins from whey.

Having thus described our invention, we claim:

1. A process for preparing a protein concentrate from whey and a protein-containing seed product, said concentrate being useful as a human food supplement, which consists of
   (a) mixing the whey and the protein-containing seed product,
   (b) applying an alkalizer to the mixture to adjust to a pH of about 9–10,
   (c) separating a juice containing soluble proteins therefrom,
   (d) acidifying the juice to about pH 7, and
   (e) drying the so-treated juice to obtain a solid product.

2. The process of claim 1 wherein the protein-containing seed product is selected from the group consisting of grains, legumes, and oil seeds.

3. The process of claim 1 wherein the protein-containing seed product is flour.

4. The process of claim 1 wherein the protein-containing seed product is a protein-containing seed by-product.

* * * * *